(12) United States Patent
Ibbitson et al.

(10) Patent No.: US 9,006,320 B2
(45) Date of Patent: Apr. 14, 2015

(54) ALKOXYLATED FLUOROALKYLPHOSPHATE COMPOSITION

(71) Applicants: Rohm and Haas Company, Philadelphia, PA (US); Dow Global Technologies LLC, Midland, MI (US)

(72) Inventors: Scott A. Ibbitson, Trappe, PA (US); Arkady L. Krasovskiy, Midland, MI (US); Partha S. Majumdar, Lansdale, PA (US); Mark R. Winkle, Lansdale, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/178,671

(22) Filed: Feb. 12, 2014

(65) Prior Publication Data
US 2014/0235772 A1    Aug. 21, 2014

Related U.S. Application Data

(60) Provisional application No. 61/765,092, filed on Feb. 15, 2013.

(51) Int. Cl.
*C09D 7/12* (2006.01)
*C09D 7/00* (2006.01)
*C09D 5/02* (2006.01)

(52) U.S. Cl.
CPC ............. *C09D 7/1233* (2013.01); *C09D 7/00* (2013.01)

(58) Field of Classification Search
CPC ............... C09D 7/12; C09D 7/00; C09D 5/02
USPC .................................................. 524/144, 130
See application file for complete search history.

(56) References Cited

U.S. PATENT DOCUMENTS

| | | |
|---|---|---|
| 3,083,224 A | 3/1963 | Brace et al. |
| 3,412,181 A | 11/1968 | Braun |
| 3,891,591 A | 6/1975 | Chang et al. |
| 6,271,289 B1 | 8/2001 | Longoria et al. |
| 7,385,077 B1 | 6/2008 | Acosta et al. |
| 7,399,887 B1 | 7/2008 | Murphy et al. |
| 7,470,818 B2 | 12/2008 | Peng et al. |
| 7,815,816 B2 | 10/2010 | Peng et al. |
| 8,022,238 B2 | 9/2011 | Peng et al. |
| 2001/0021738 A1 | 9/2001 | Enna et al. |
| 2001/0026843 A1 | 10/2001 | Carignano et al. |
| 2003/0134952 A1 | 7/2003 | Maccone et al. |
| 2003/0134972 A1 | 7/2003 | Maccone et al. |
| 2004/0062873 A1 | 4/2004 | Jung et al. |
| 2004/0127393 A1 | 7/2004 | Valpey et al. |
| 2006/0229406 A1 | 10/2006 | Silverman et al. |
| 2008/0145552 A1 | 6/2008 | Berrettini et al. |
| 2009/0286885 A1 | 11/2009 | Qiu et al. |
| 2010/0311572 A1 | 12/2010 | Seeber et al. |
| 2011/0091408 A1 | 4/2011 | Raghavanpillai |
| 2012/0178075 A1* | 7/2012 | Kaneumi et al. ............... 435/1.1 |

FOREIGN PATENT DOCUMENTS

DE     102012004138 B3    9/2012
WO    WO 2011105347 A1 *  9/2011

* cited by examiner

*Primary Examiner* — Michael M Bernshteyn
(74) *Attorney, Agent, or Firm* — Reid S. Willis

(57) ABSTRACT

The present invention relates to a composition comprising an aqueous dispersion of a binder and a salt of the following fluoroalkyl phosphate:

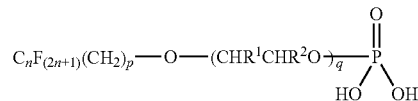

where n, p, q, $R^1$, and $R^2$ are defined herein. The composition of the present invention is useful as a block additive in paint formulations.

8 Claims, No Drawings

ALKOXYLATED FLUOROALKYLPHOSPHATE COMPOSITION

BACKGROUND

The present invention relates to an aqueous composition comprising a binder and an alkoxylated alkylfluorophosphate, which is useful as a block additive in coatings formulations.

Block resistance is the capability of a paint not to stick to itself. For example, good block resistance helps keep a door from sticking to the door jamb or a window from sticking to its frame. Block resistance is achieved in waterborne paint formulations through block additives such as a fluorinated alkyl surfactant that contains a high concentration of fluorine. These highly fluorinated compounds typically give better performance in architectural coatings compositions than those containing lower fluorine levels.

An example of a class of commercial fluorinated alkyl block additives is $C_8$ and above perfluorinated hydrocarbons and compounds bearing this substituent, such as $CF_3(CF_2)_7CH_2CH_2OPO_3^{-2}$; although effective, this class of block additives is targeted to be banned as an additive in binder systems in 2015. Accordingly, it would be desirable to find efficient fluorinated surfactants that overcome the objections to $C_8$ and above fluoroalkyl phosphates while maintaining or improving the block performance of binders.

SUMMARY OF THE INVENTION

The present invention addresses a need in the art by providing a composition comprising an aqueous dispersion of a binder and a phosphate salt of the following compound:

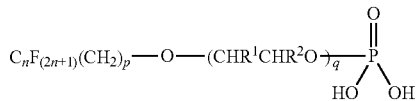

where n is from 2 to 6; p is 1, 2 or 3; q is 1 to 5; one of $R^1$ and $R^2$ is H, $CH_3$, or $CH_2CH_3$, and the other of $R^1$ and $R^2$ is H; and wherein the concentration of the phosphate salt is from 0.01 to 0.5 weight percent, based on the weight of the binder. The present invention addresses a need by providing a composition that includes a fluoroalkyl phosphate that is effective as a block additive and that is expected to comply with regulatory standards.

DETAILED DESCRIPTION OF THE INVENTION

The present invention is a composition comprising an aqueous dispersion of a binder and a phosphate salt of the following compound:

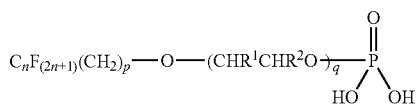

where n is from 2 to 6; p is 1, 2 or 3; q is 1 to 5; one of $R^1$ and $R^2$ is H, $CH_3$, or $CH_2CH_3$, and the other of $R^1$ and $R^2$ is H; and wherein the concentration of the phosphate salt is from 0.01 to 0.5 weight percent, based on the weight of the binder. The phosphate salt is typically prepared as a mixture of phosphates salts; accordingly, q preferably represents a mole average length of the alkoxylated chain. Thus, a mixture with equimolar amounts of salts of $CF_3(CF_2)_5CH_2CH_2O(CH_2CH_2O)_2P(O)(OH)_2$ and $CF_3(CF_2)_5CH_2CH_2O(CH_2CH_2O)_3P(O)(OH)_2$ would have a q value of 2.5.

A preferred phosphate salt is a mixture of fluoroalkyl phosphates represented as follows:

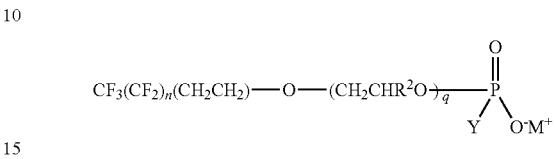

where n is 3 to 5, preferably 3 or 5; q is 2 to 4, more preferably 2 to 3; Y is OH or $O^-M^+$, where $M^+$ is preferably an alkali metal cation such as $Na^+$ or $K^+$, or an ammonium cation such as $NH_4^+$, N-(2-hydroxyethyl)ammonium, N,N-di(2-hydroxyethyl)ammonium, N,N,N-tri(2-hydroxyethyl)ammonium, trimethylammonium, and triethylammonium.

The fluoroalkyl phosphates can be conveniently prepared in two steps. In a first step, $C_nF_{(2n+1)}(CH_2)_pOH$ can be reacted with a stoichiometric excess of ethylene oxide, propylene oxide, or butylenes oxide, preferably at elevated temperature and pressure to achieve the alkoxylate, which can then be reacted with $POCl_3$, quenched with water, and neutralized with based to form the desired fluoroalkyl phosphate. Scheme 1 depicts this preparation:

Scheme 1 - Preparation of Fluoroalkyl Phosphate

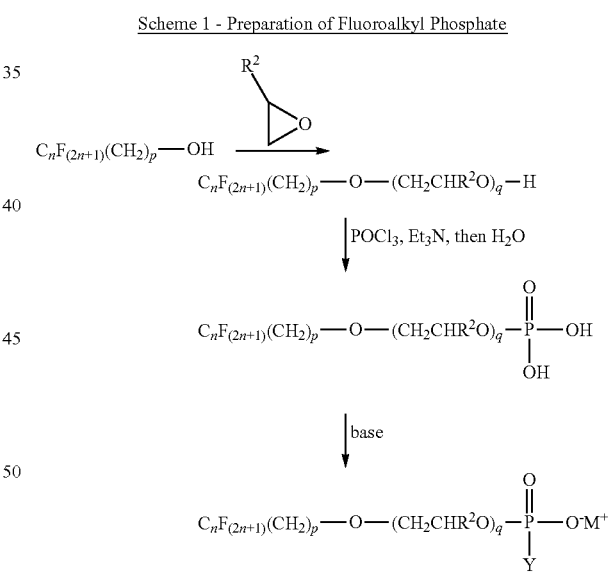

It is understood that some amount of the regioisomer: $C_nF_{(2n+1)}(CH_2)_pO$—$(CHR^1CH_2O)_q$—$P(O)(OH)_2$ can also form.

The binder is preferably a stable aqueous dispersion of polymer particles having a $T_g$ in the range of from −60° C. to 60° C., and can be any binder suitable for coatings compositions, including aqueous dispersions of acrylic, styrene-acrylic, vinyl ester-acrylic, vinyl ester-ethylene, silicone, urethane, vinylidene halide, and vinyl halide polymer particles. The concentration of the fluoroalkyl phosphate is preferably from 0.02 weight percent to 0.2, and more preferably to 0.1 weight percent based on the weight of the binder solids.

The composition is preferably suitable for coating composition, preferably a paint. As such, the composition may include a number of additional materials including solvents; pigments such as unencapsulated or partially or completely encapsulated $TiO_2$; fillers; defoamers; surfactants; dispersants; thickeners; coalescents; colorants; preservatives; flow agents; leveling agents; and neutralizers. It has been discovered that compositions containing the fluoroalkyl phosphates described herein show excellent block resistance at low concentrations without the use of any ancillary block additives.

EXAMPLES

Intermediate 1A: Ethoxylation of 1H,1H,2H,2H-Perfluorooctan-1-ol 1H,1H,2H,2H-perfluorooctan-1-ol (3 mmol), dimetalcyanide (DMC, ~0.1-0.2 wt. %), THF (1 mL) were loaded into a glass PPR vial. The reaction was carried out in a Symyx Parallel Pressure Reactor (PPR). Ethylene oxide (EO, 9 mmol) was delivered via an Isco syringe pump equipped with a robotically-controlled needle and compressed gas microvalve connected to the Cavro robot arm inside the PPR glove box. The glass inserts along with removable PEEK stir paddles for the cells were dried in vacuo at 125° C. overnight. The insert with the alcohol, THF and DMC was loaded into each PPR well, and pressurized with $N_2$ to 50 psi. EO was introduced at 90° C. and the reaction was stirred for 3 h at that temperature. The resulting ethoxylate was used in the next step without additional purification.

Intermediates 2A-4A: Propoxylation of 1H,1H,2H,2H-Perfluorooctan-1-ol

The procedure for Intermediate 1 was followed except that propylene oxide (Intermediate 2, 12 mmol; Intermediate 3, 15 mmol; Intermediate 4, 18 mmol) was used as the alkoxylating agent and the insert with the alcohol, propylene oxide, and DMC were pressurized with $N_2$ to 50 psi and heated to 110° C. for 18 h. The resulting propoxylates were used in the next step without additional purification.

Intermediates 5A-8A: Butoxylation of 1H,1H,2H,2H-Perfluorooctan-1-ol

The procedure for Intermediate 1 was followed except that butylene oxide (Intermediate 5, 9 mmol; Intermediate 6, 12 mmol; Intermediate 7, 15 mmol; Intermediate 8, 18 mmol) was used as the alkoxylating agent and the insert with the alcohol, butylene oxide, and DMC were pressurized with $N_2$ to 50 psi and heated to 110° C. for 18 h. The resulting butoxylates were used in the next step without additional purification.

Intermediates 1B-8B: Preparation of Phosphoric Acids from Alkoxylated 1H,1H,2H,2H-Perfluorooctan-1-ol Intermediates 1-8 were each diluted with THF (~tenfold) and added slowly to the premixed $POCl_3$ (2.2 equiv. for ethoxylate; 1.2 equiv. for propoxylate or butoxylate, $Et_3N$ (1.2 equiv.), and THF (100 mL)) at 0° C. After stirring overnight at room temperature under $N_2$, the reaction mixture was carefully quenched with ~200 mL of ice water. The aqueous solution was saturated with NaCl and the product was extracted with ethyl acetate. Solvents were evaporated in vacuo and the resulting viscous material was dissolved in diethyl ether and filtrated through a 1-µm filter. Ether was removed in vacuo and the products were used in the next step without additional purification. Intermediates 1B-8B are illustrated in Table 1.

TABLE 1

Characterization of Fluoroalkyl Alkoxylated Phosphoric Acids

| Intermediate | Structure |
|---|---|
| 1B | $CF_3(CF_2)_5(CH_2CH_2)-O-(CH_2CH_2O)_{2.6}P(O)(OH)_2$ |
| 2B | $CF_3(CF_2)_5(CH_2CH_2)-O-(CH_2CH(CH_3)O)_{3.5}P(O)(OH)_2$ |
| 3B | $CF_3(CF_2)_5(CH_2CH_2)-O-(CH_2CH(CH_3)O)_{4.4}P(O)(OH)_2$ |
| 4B | $CF_3(CF_2)_5(CH_2CH_2)-O-(CH_2CH(CH_3)O)_{5.1}P(O)(OH)_2$ |
| 5B | $CF_3(CF_2)_5(CH_2CH_2)-O-(CH_2CH(CH_2CH_3)O)_{2.4}P(O)(OH)_2$ |
| 6B | $CF_3(CF_2)_5(CH_2CH_2)-O-(CH_2CH(CH_2CH_3)O)_{3.0}P(O)(OH)_2$ |
| 7B | $CF_3(CF_2)_5(CH_2CH_2)-O-(CH_2CH(CH_2CH_3)O)_{4.3}P(O)(OH)_2$ |
| 8B | $CF_3(CF_2)_5(CH_2CH_2)-O-(CH_2CH(CH_2CH_3)O)_{4.8}P(O)(OH)_2$ |

Preparation of Phosphate Salts

Intermediate 1C: Preparation of Phosphate Salt

Ethanolamine (1.2 g) was added to the Intermediate 1B (2.0 g). Deionized water (7.0 g) was then added and the mixture was gently stirred to produce a clear solution.

Intermediate 2C: Preparation of Phosphate Salt

Ethanolamine (0.2 g) was added to Intermediate 2B (1.0 g). Deionized water (5.0 g) was then added and the mixture was gently stirred to produce a clear solution.

Intermediate 3C: Preparation of Phosphate Salt

Ethanolamine (1.0 g) was added to Intermediate 3B (2.0 g). Deionized water (7.0 g) was then added and the mixture was gently stirred to produce a clear solution.

Intermediate 4C: Preparation of Phosphate Salt

Ethanolamine (0.8 g) was added to Intermediate 4B (2.0 g). Deionized water (7.75 g) was then added and the mixture was gently stirred to produce a clear solution.

Intermediate 5C: Preparation of Phosphate Salt

Ethanolamine (1.1 g) was added to Intermediate 5B (2.0 g). Deionized water (7.75 g) was then added and the mixture was gently stirred to produce a clear solution.

Intermediate 6C: Preparation of Phosphate Salt

Ethanolamine (1.1 g) was added to Intermediate 6B (2.0 g). Deionized water (7.75 g) was then added and the mixture was gently stirred to produce a clear solution.

Intermediate 7C: Preparation of Phosphate Salt

Ethanolamine (0.2 g) was added to Intermediate 7B (1.0 g). Deionized water (5.0 g) was then added and the mixture was gently stirred to produce a clear solution.

Intermediate 8C: Preparation of Phosphate Salt

Ethanolamine (0.8 g) was added to Intermediate 8B (2.0 g). Deionized water (7.25 g) was then added and the mixture was gently stirred to produce a clear solution.

Abbreviations:

| Materials ID | Abbreviation |
|---|---|
| Ti Pure R-706 Rutile TiO₂ Powder | TiO₂ Powder |
| Foamstar A34 Defoamer | Defoamer |
| TERGITOL ™ TMN 100X Surfactant | Surfactant |
| TAMOL ™ 1124 Dispersant | Dispersant |
| AMP ™-95 Amino Alcohol | Amino Alcohol |
| RHOPLEX AC-261LF Acrylic Emulsion Polymer | Acrylic emulsion polymer |
| Optifilm Enhancer 400 Coalescent | Coalescent |
| ACRYSOL ™ RM-5000 Rheology Modifier | Thickener 1 |
| ACRYSOL ™ RM-895 Rheology Modifier | Thickener 2 |

TERGITOL, TAMOL, AMP, RHOPLEX, and ACRYSOL are all Trademarks of the Dow Chemical Company of its Affiliates Paint Formulations (less the block additive) were prepared using the materials in amounts shown in Table 2.

TABLE 2

Paint Formulations Without Block Additive

| Stage | Materials | Wt (g) |
|---|---|---|
| Grind | TiO₂ | 322.07 |
| | Water | 110.00 |
| | Defoamer | 1.00 |
| | Surfactant | 2.23 |
| | Dispersant | 6.08 |
| | Grind Sub-total | 441.38 |
| Let-down | Acrylic Emulsion Polymer | 468.80 |
| | Defoamer | 2.01 |
| | Ammonia (28%) | 0.30 |
| | Coalescent | 11.75 |
| | Thickener 1 | 41.09 |
| | Thickener 2 | 6.01 |
| | Water | 137.06 |
| | Total | 1108.39 |

Example 1

Preparation of Paint Composition with Block Additive

Intermediate 1C (0.11 g) was mixed with the composition illustrated in Table 2 (100 g) in a 120-mL plastic container, using a Miller GyroMixer for 9 min to ensure thorough mixing.

Example 2

Preparation of Paint Composition with Block Additive

The procedure described in Example 1 was used except that Intermediate 2C (0.13 g) was mixed with the composition illustrated in Table 2.

Example 3

Preparation of Paint Composition

The procedure described in Example 1 was used except that Intermediate 3C (0.11 g) was mixed with the composition illustrated in Table 2.

Example 4

Preparation of Paint Composition with Block Additive

The procedure described in Example 1 was used except that Intermediate 4C (0.11 g) was mixed with the composition illustrated in Table 2.

Example 5

Preparation of Paint Composition with Block Additive

The procedure described in Example 1 was used except that Intermediate 5C (0.11 g) was mixed with the composition illustrated in Table 2.

Example 6

Preparation of Paint Composition with Block Additive

The procedure described in Example 1 was used except that Intermediate 6C (0.11 g) was mixed with the composition illustrated in Table 2.

Example 7

Preparation of Paint Composition with Block Additive

The procedure described in Example 1 was used except that Intermediate 7C (0.13 g) was mixed with the composition illustrated in Table 2.

Example 8

Preparation of Paint Composition with Block Additive

The procedure described in Example 1 was used except that Intermediate 8C (0.11 g) was mixed with the composition illustrated in Table 2.

Example 9

Preparation of Paint Composition with Block Additive

The procedure described in Example 1 was used except that Intermediate 2C (0.066 g) was mixed with the composition illustrated in Table 2.

Example 10

Preparation of Paint Composition with Block Additive

The procedure described in Example 1 was used except that Intermediate 4C (0.056 g) was mixed with the composition illustrated in Table 2.

Example 11

Preparation of Paint Composition with Block Additive

The procedure described in Example 1 was used except that Intermediate 5C (0.057 g) was mixed with the composition illustrated in Table 2.

Example 12

Preparation of Paint Composition with Block Additive

The procedure described in Example 1 was used except that Intermediate 8C (0.053 g) was mixed with the composition illustrated in Table 2.

Coating Applications:

Drawdowns of the coatings were prepared at 25° C. and 50% relative humidity (RH) using a 3-mil bird applicator over white Leneta chart. The coatings were dried for 24 h at 25° C. and 50% RH before performing gloss and block resistance measurements.

Test Method:

ASTM D4946-89 was followed to perform peel block resistance. For each coating, twelve 1.5"×1.5" sections were cut from the chart to run triplicates for room temperature and hot block. Two each of the cut squares were placed face-to-face, with paint surfaces in contact with each other. For room temperature block testing, for each pair of square on a flat surface, a rubber stopper (No. 8) was placed on the top with the narrow side in contact with the specimens. A 1000-g weight was placed on the top of each stopper. After 30 min, the weights and stoppers were removed from the specimens, which were then tested for room temperature block resistance. For hot block, specimens were placed in an oven at 50° C. on a flat metal plate. Rubber stoppers (No. 8) and weights were equilibrated in the oven. A rubber stopper was placed with narrow side down on top each specimen in the oven. Then, a 1000-g weight was placed over each stopper. After 30 min, weights and stoppers were removed and the specimens were removed from the oven and allowed to cool at room temperature for 30 min before testing for hot block resistance. The results of room temperature block and hot block were reported on a scale of 0 to 10 by peeling apart the specimens with slow and steady force. Table 3 illustrates the rating system for reporting peel block resistance.

TABLE 3

Description of tack and seal for rating block resistance.

| Rating | Description of tack and seal |
|---|---|
| 10 | No tack, perfect |
| 9 | Trace tack, excellent |
| 8 | Slight tack, very good |
| 7 | Slight tack, good |
| 6 | Moderate tack, good |
| 5 | Moderate tack, fair |
| 4 | Severe tack, no seal, fair |
| 3 | 5-25% seal, poor |
| 2 | 25-50% seal, poor |
| 1 | 50-75% seal, poor |
| 0 | Complete seal, very poor |

Table 4 illustrates block properties of the coatings from formulations of Examples 1 to 8. The concentration of the block additive was 0.1 weight percent, based on the weight of the binder solid. Block resistance is measured after 24 h drying at 25° C. and 50% relative humidity.

TABLE 4

Block Resistance of Paint Formulations using ~0.1 wt % Additive

| | | Block resistance | |
|---|---|---|---|
| Coating ID | Block additive | Room temperature | Hot block |
| Example 1 | Intermediate 1C | 9 | 9 |
| Example 2 | Intermediate 2C | 9 | 8 |
| Example 3 | Intermediate 3C | 9 | 7 |
| Example 4 | Intermediate 4C | 8 | 7 |
| Example 5 | Intermediate 5C | 9 | 8 |
| Example 6 | Intermediate 6C | 8 | 7 |
| Example 7 | Intermediate 7C | 8 | 6 |
| Example 8 | Intermediate 8C | 8 | 5 |

The results show that the coatings from formulations containing the intermediates 1C-8C showed a significant improvement in block resistance as compared to the formulation containing no block additive, both at room temperature and hot block. Without block additive, the block resistance was found to be 1 (room temperature) and 0 (hot block).

When the concentration of block additive was reduced to 0.05 weight percent, block resistance is still observed but the difference in efficacy for longer chain length alkoxylated groups is more pronounced, as seen in Table 5.

TABLE 5

Block Resistance of Paint Formulations using ~0.05 wt % Additive 2C, 4C, 5C, 8C

| | | Block resistance | |
|---|---|---|---|
| Coating ID | Block additive | Room temperature | Hot block |
| Example 9 | Intermediate 2C | 9 | 8 |
| Example 10 | Intermediate 4C | 8 | 5 |
| Example 11 | Intermediate 5C | 9 | 7 |
| Example 12 | Intermediate 8C | 7 | 4 |

Though not bound by theory, it is believed that longer alkoxylated groups disadvantageously increase binder compatibility during the process of paint drying, which prevents the blooming of block additive to coating air interface resulting decrease in efficacy. Accordingly, the short chain alkoxylated groups show the best performance.

The invention claimed is:

1. A composition comprising an aqueous dispersion of a binder and a phosphate salt of the following compound:

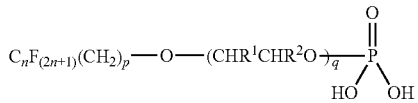

where n is from 2 to 6; p is 1, 2 or 3; q is 1 to 5; one of $R^1$ and $R^2$ is H, $CH_3$, or $CH_2CH_3$, and the other of $R^1$ and $R^2$ is H; and wherein the concentration of the phosphate salt is from 0.01 to 0.5 weight percent, based on the weight of the binder.

2. The composition of claim 1 wherein the phosphate salt is a mixture of fluoroalkyl phosphates represented by the following structure:

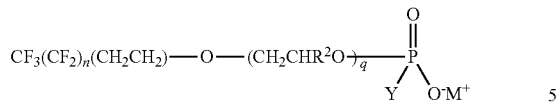

where n is 3 to 5; Y is OH or O⁻M⁺, where M⁺ is an alkali metal cation or an ammonium cation.

3. The composition of claim 2 wherein the binder is selected from the group consisting of acrylic, styrene-acrylic, vinyl ester-acrylic, and vinyl ester-ethylene polymers; and the concentration of the fluoroalkyl phosphate is from 0.2 to 0.2 weight percent, based on the weight of binder solids.

4. The composition of claim 3 wherein $R^2$ is H; n is 3 or 5; and q is 2 to 4.

5. The composition of claim 3 wherein $R^2$ is $CH_3$; n is 3 or 5; and q is 2 to 4.

6. The composition of claim 3 wherein $R^2$ is $CH_2CH_3$; n is 3 or 5; and q is 2 to 4.

7. The composition of claim 2 wherein M⁺ is N-(2-hydroxyethyl)ammonium.

8. The composition of claim 1 which is a paint formulation which further includes $TiO_2$ and one or more additives selected from the group consisting of fillers; defoamers; surfactants; dispersants; thickeners; coalescents; colorants; preservatives; flow agents; leveling agents; and neutralizers.

\* \* \* \* \*